June 5, 1923.
R. S. BUSBY
TILTING AND LOCKING DEVICE FOR STEERING WHEELS
Original Filed June 25, 1921   3 Sheets-Sheet 1
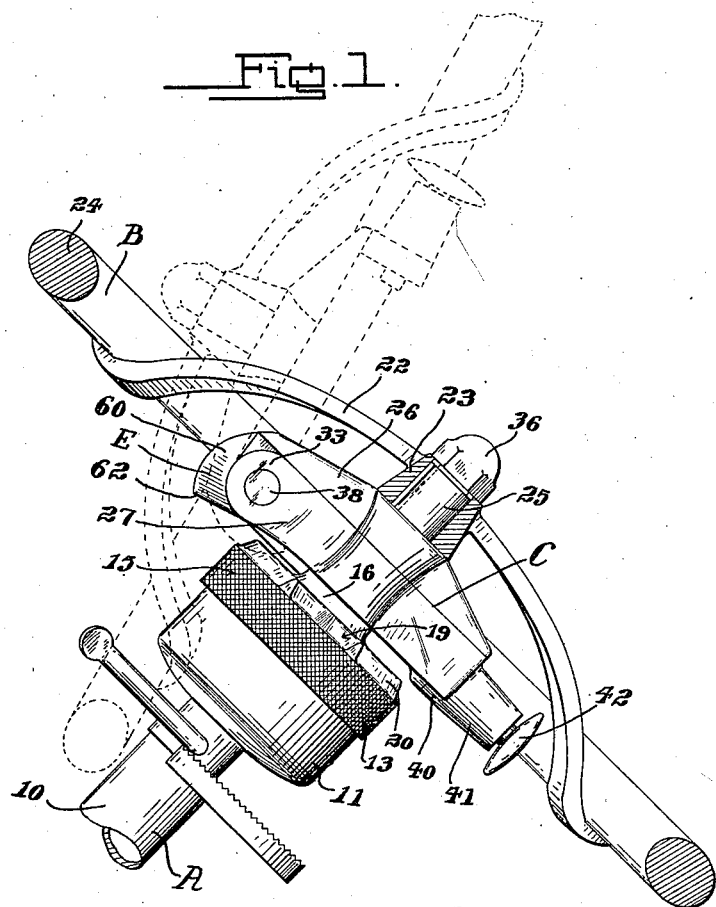
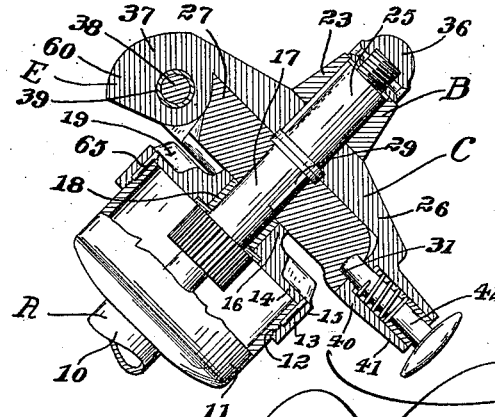
Inventor
Robert S. Busby

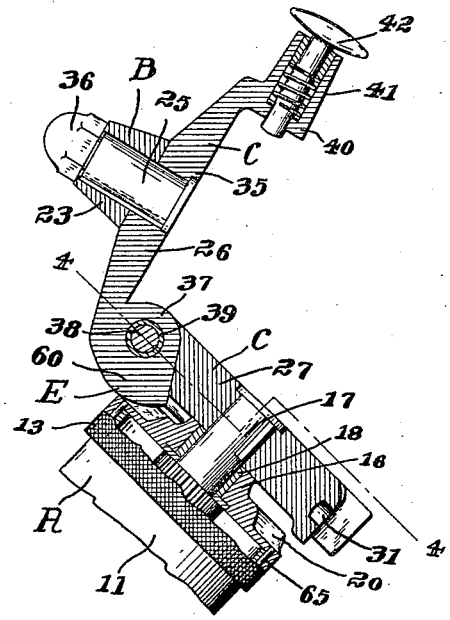
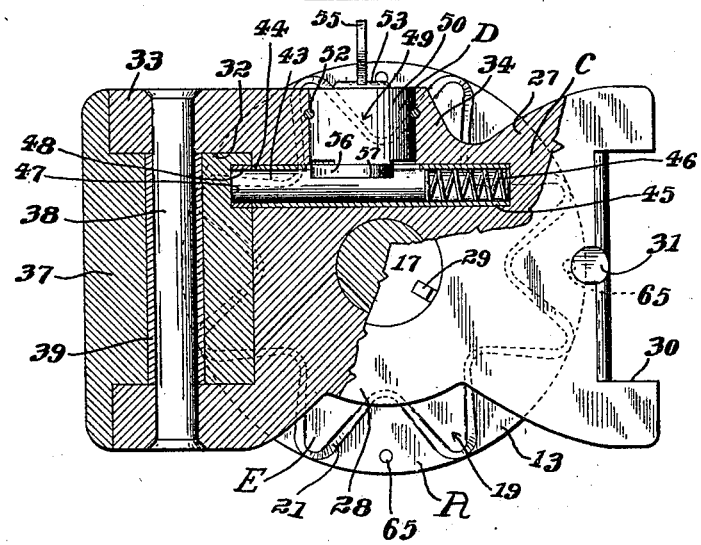

June 5, 1923.
R. S. BUSBY
1,457,722
TILTING AND LOCKING DEVICE FOR STEERING WHEELS
Original Filed June 25, 1921   3 Sheets-Sheet 3
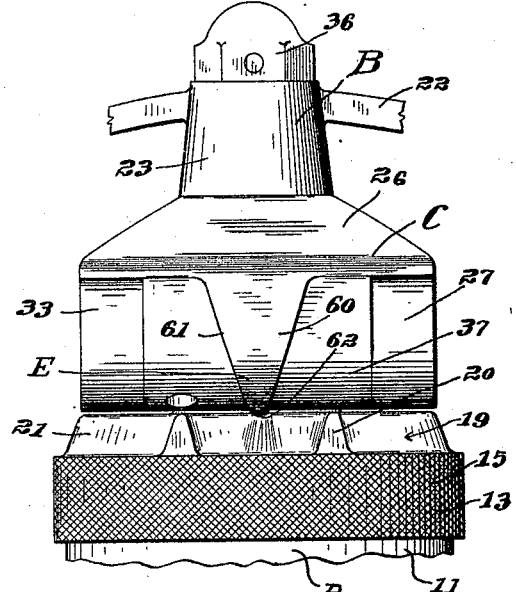
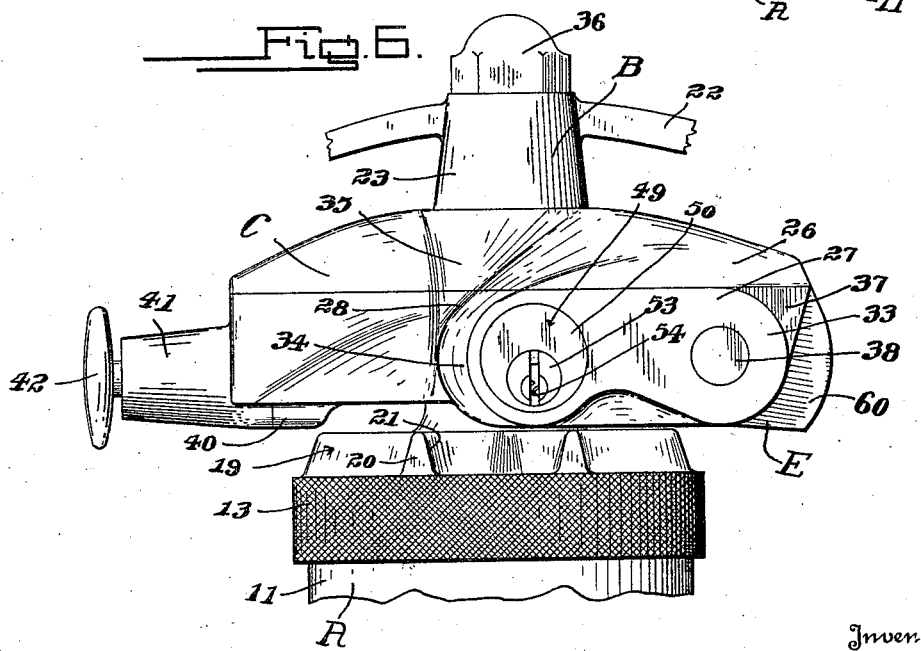
Inventor
Robert S. Busby
By Lancaster and Allwine
Attorneys Patented June 5, 1923.

1,457,722

UNITED STATES PATENT OFFICE.

ROBERT S. BUSBY, OF JACKSONVILLE, FLORIDA.

TILTING AND LOCKING DEVICE FOR STEERING WHEELS.

Application filed June 25, 1921, Serial No. 480,313. Renewed April 20, 1923.

*To all whom it may concern:*

Be it known that I, ROBERT S. BUSBY, a citizen of the United States, residing at Jacksonville, in the county of Duval and State of Florida, have invented certain new and useful Improvements in Tilting and Locking Devices for Steering Wheels, of which the following is a specification.

This invention relates to tiltable and lockable steering wheels for motor vehicles, and is an improvement on my pending application filed June 17, 1921, Serial No. 478,369, and the primary object of the present invention is to provide an improved and simple means for locking the steering wheel against steering movement when the same has been swung into its tilted position, said means being so constructed as to permit the wheel to be readily locked and swung into tilted position irrespective of the relation of the front steering wheels to a curb and without necessitating the aligning of a locking number with a recess or keeper, as was necessary in my application above referred to.

A further object of the invention is to provide an improved means for locking the steering wheel against rotary movement when swung into its tilted position, which eliminates the necessity of providing a reciprocating locking bolt, and which merely embodies a rigid locking cam or lug formed on one of the castings of the device for engagement with locking fingers formed on the rigid portion of the steering column or its shell, said locking cam or lug and fingers being so formed as to guide the wheel into the tilted and locked position.

A further object of the invention is to provide an improved means for associating the various working parts of the device together, so that all wear on the main parts of the device will be eliminated, said means embodying wear members which can be replaced when necessary or desirable.

A still further object of the invention is to provide an improved means for securing the cap of the steering gear housing of the column to the housing, so that said means or certain of said means will be always covered by the casting, whereby the removal of the locking means by unauthorized persons will be absolutely precluded.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of the improved tilting device, the steering wheel being shown in section and in full lines in its operative position and in dotted lines in its inoperative or tilted position.

Figure 2 is a longitudinal section through the improved device showing the arrangements of the castings in relation to each other when the steering wheel is in its normal position.

Figure 3 is a view similar to Figure 2 showing the upper casting swung to its tilted position.

Figure 4 is a horizontal section taken on the line 4—4 of Figure 3.

Figure 5 is a rear elevation of the improved tilting and locking device.

Figure 6 is an enlarged side elevation of the improved device looking in the opposite direction from Figure 1.

Figure 7 is a plan view of the cap of the steering gear housing.

Referring to the drawings in detail, wherein similar reference characters designate corresponding parts throughout the several views, the letter A indicates a steering column; B, a steering wheel; and C the improved attachment for connecting the steering column and wheel together.

The steering column A and the steering wheel B are of the ordinary type, utilized in a large number of motor vehicles now on the market, and the improved attachment is particularly adapted for use in connection therewith, although the device is capable and adaptable to other types of steering wheels and columns. As shown the column A includes the outer stationary shell 10, which has its upper end enlarged to form a casing 11, which is utilized in this instance for housing the steering gear. The outer surface of the casing 11 is externally screw threaded as at 12 for the reception of the casing cap 13. The casing cap 13 includes a disc shaped upper wall 14, and a depending annular flange 15 which is internally threaded. The cap 13 is provided with an axial boss 16, which rotatably receives the steering wheel stub shaft 17. If so desired a suitable wear member or bearing 18 can be interposed between the boss and the cap 13. The outer surface of the cap is provided with a star shaped locking member 19, which projects outwardly from the outer face of the disc wall 14. This star shaped locking member 19 can be cast integral with the cap 13 if so desired. As shown this locking member 19 includes a plurality of radially extending points 20 which are gradually tapered toward their outer ends defining V-shaped locking notches 21. The walls of the locking notches 21 or the sides of the tapered fingers 20 are gradually inclined downwardly and outwardly to define guiding surfaces, the purpose of which will be hereinafter more fully apparent. It can be seen that the cap 13 differs from the ordinary construction of cap in that the same is provided with the star shaped locking member 19. The steering stub shaft 17 is operatively connected by a suitable type of planetary gearing (not shown) with the main steering shaft. The steering stub shaft 17 ordinarily receives the steering wheel B, but in this instance the improved tilting and locking device C is interposed between the wheel and the steering stub shaft as is readily apparent by referring to the drawings. The steering wheel B includes the spider 22, the axial hub 23, and the rim 24. It can be seen that the spider 22 connects the hub 23 with the rim 24. The hub 23 is provided with an axial opening for the reception of the stud 25, which is carried by and forms a part of the improved tilting and locking device C. In the ordinary structure, the hub 23 receives the ordinary stub steering shaft 17.

The improved tilting and locking device C includes an upper plate 26 and a lower plate 27, the means D for holding the upper plate 26 and the steering wheel B against accidental movement, and the novel means E for locking the attachment and wheel against rotary and steering movement when in its tilted position.

The two plates 26 and 27 can be formed of any desired metal, such as aluminum or the like, and either cast in the desired form or machined to the desired size and configuration.

The rear plate 27 includes a central boss or body 28, which axially receives the stub steering shaft 17, which is keyed in place by means of a suitable key 29. The upper end of the steering rod or shaft 17 can be upset in order to prevent the removal of the plate or casting 23 therefrom by unauthorized persons. The forward end of the plate or casting 27 is slightly increased in width, and the forward edge thereof is provided with an inwardly extending notch 30. The inner wall of the notch 30 is provided with a keeper recess 31 the purpose of which will be hereinafter more fully described.

The opposite end of the plate or casting 27 is also increased in width, and has its outer wall or edge provided with an inwardly extending notch 32, which defines outwardly extending pivot ears 33. This portion of the plate or casting 27 directly inwardly of the ears 33 is provided with an outwardly extending enlargement 34, which receives a portion of the locking means D which will be hereinafter more fully described. The outer plate 26 also includes a central boss 35 which receives the stud 25, the inner end of which can be upset in order to prevent the removal thereof from the plate or casting 26 by unauthorized persons. The stud 25 may be keyed or otherwise secured to the plate 26 as well as to the hub 23 of the wheel B.

The upper end of the stud can be reduced in diameter and threaded for the reception of a cap nut 36, which can be pinned or keyed thereto if so desired. The outer end of the plate 26 is provided with a depending hinged barrel 37, which is adapted to lie between the pivot ears 33, and a suitable pivot pin 38 is extended through the ears 33 and barrel 37, and has its terminals upset in order to prevent the withdrawal thereof. If so desired, a suitable wear member or bearing 39 can be inserted in the forward hinged barrel in order to prevent undue wear thereon. The inner end of the plate 26 is provided with a depending forwardly extending lug 40 which is adapted to fit in the notch 30. The lug 40 is provided with a sleeve 41 which slidably support the latch 42, which is adapted to engage the keeper recess 31 as described in my copending application above refered to.

The means D for locking the steering wheel in its tilted position is similar to the locking means described in my pending application heretobefore referred to, with the exception that the sliding locking bolt 43 is arranged relatively closer to the lower face of the plate 27, in order that the same will be completely hidden from view when the upper casting 26 is swung to its tilted position. This prevents the sliding back of the bolt by unauthorized persons. The bolt 43 is mounted for movement longitudinally of the plate 27 in a bore 44 which can be provided with a suitable wear lining or bearing 45. The bore 44 is formed in the plate 27 adjacent to one longitudinal side thereof and opens out through the inner wall of the notch 32. This bolt 43 is normally urged outwardly of the bore by means of an expansion spring 46, which engages the inner wall of the bore and the inner end of the bolt. The hinged barrel 37 is provided with a keeper recess 47 which is adapted to be moved into alignment with the bore 44, when the plate 26 and the steering wheel B are moved to a tilted position. The recess 47 can be provided with a suitable wear or bearing member 48 is so desired. It can be seen that when the steering wheel is moved to its tilted position, the bolt 43 will be forced into the keeper recess 47 by means of the spring 46; and that the plate 26 and the steering wheel will be automatically locked in their tilted position. In order to hold the bolt 43 against movement when in its locked position, an ordinary pin tumbler mechanism 49 is provided. This mechanism is carried by the lug 34 and extends transversely of the plate 27, as clearly shown in Figure 4 of the drawings. The pin coupler mechanism 49 is of the usual or any preferred make or construction, and includes the shell 50 which can be held against movement by means of suitable pins 52. The shell 51 receives the ordinary revoluble plug 53, which is provided with a key way 54 for the reception of a key 55. The key 55 serves to actuate the usual pin tumblers and their complement drivers (not shown). The inner end of the plug 53 carries a cam 56, which is fitted in a suitable notch 47, formed in the bolt 43. It can be seen that when the correct key 55 is inserted in the key way and the plug is turned, that the cam 56 will engage the rear wall of the notch 57 in the bolt 43 and force the bolt 43 inwardly and permit the plate 26 to be swung to its normal abutting position in engagement with the upper face of the lower plate 27. When the plate is moved to its lowered position, the same is held against accidental movement by means of the latch 42 as heretobefore stated.

The means E for preventing the turning of the device C and the steering wheel B when the upper plate or casting 26 is in its tilted position with the steering wheel B, includes a cam or locking lug 60, which is formed on the outer surface of the hinged barrel 37 at the central portion thereof. This locking cam or lug 60 is of substantially a V-shape and has its opposite sides gradually tapered as at 61 to form the pointed end 62, which is adapted to ride into any one of the V-shaped notches 21 defined by the tapered fingers 20 of the star shaped locking members 19.

It can be seen that when the casting or outer plate 26 is swung to its tilted position the locking cam or lug 60 will be moved in between the fingers 20 of the locking device 19 and thus the steering wheel will be held against turning or steering movement. If the lug 60 is not in direct alignment with a notch defined by the fingers 20, the inclined sides 61 of the cam or lug 60 will engage the inclined sides 21 of the fingers 20 and the cam will be guided into a locking position. This entirely eliminates the necessity of aligning the lug with the locking notches or recesses. This construction also permits the steering wheel to be readily locked in position if the front steering wheels of the vehicle have been driven into engagement with the side of a curb or other stop, as heretobefore stated, as it is not necessary to align the lug 60 with the locking notches.

In order to prevent the removal of the cap 13 from the shell 11 by unauthorized persons, suitable retaining pins 65 are inserted in the cap in engagement with the threads of the cap and the threads formed on the shell 11. These pins are so disposed that certain of the same will be covered by the locking device C irrespective of the position thereof during the turning movement of the steering wheel. Thus the pins will be prevented from being engaged by a tool or the like.

From the foregoing description, it can be seen that an exceptionally simple and durable means has been provided for locking the steering wheel against steering movement when the same has been moved to its tilted position, and which entirely eliminates the provision of sliding locking bolts or the like. The provision of the locking cam or lug 60 also permit the wheel B to be swung back further than has heretobefore been possible in my other structure.

Changes in details may be made without departing from the spirit or scope of this invention; but,

I claim:

1. In a steering device, the combination with a steering column including a shell, a steering shaft and a steering wheel, of an attachment therefor interposed between the wheel and shaft including a pair of hingedly connected normally abutting members, the members being connected respectively with the steering shaft and wheel, whereby the steering wheel is permitted to be swung to a tilted position in relation to the steering column, locking members formed on the shell at spaced points around the same, and a rigid locking member formed on the member carrying the wheel for engaging certain of the locking members carried by the steering shell when the steering wheel is swung to a tilted position irrespective of the position of the steering wheel in relation to the column, whereby steering movement of the wheel will be absolutely precluded when the steering wheel is moved to its tilted position.

2. In a steering device, the combination with a steering column including a shell, a shaft and a steering wheel, of an attachment therefor interposed between the wheel and shaft including a pair of hingedly connected normally abutting members, the members being connected respectively with the steering shaft and steering wheel, whereby the steering wheel is permitted to be swung to a pivoted position in relation to said column, locking means for preventing swinging movement of the members in relation to each other when the steering wheel has been swung to its tilted position, rigid abutments formed at spaced points around the shell, and a rigid locking lug formed on the outer member for engaging with certain of the abutments irrespective of the position of the steering wheel to the shell when the steering wheel has been swung to its tilted position to prevent steering movement thereof.

3. In a steering device, the combination with a steering column including a shell, a steering shaft, a cap for the upper end of the shell, and a steering wheel, of a pair of hingedly connected members interposed between the steering wheel and the steering shaft for connection respectively with the wheel and shaft whereby the wheel is permitted to be swung to a tilted position in relation to the column, means for holding the members against swinging movement when the steering wheel has been swung to its tilted position, a star shaped locking member disposed on the upper surface of the cap of the shell defining a plurality of V-shaped notches, and a rigid locking cam formed on the outermost locking member arranged to extend in any one of said notches when the steering wheel is swung to its tilted position.

4. In a steering device, the combination with a steering column including a shell, a steering shaft, a cap for the upper end of the shell and a steering wheel, of a pair of hingedly connected members interposed between the wheel and the steering shaft for connection respectively with the wheel and shaft, whereby the steering wheel is permitted to be swung to a tilted position with relation to the column, a locking device for holding the members against movement when the wheel is swung to its tilted position, a star shaped locking member formed on the upper surface of the cap including a plurality of tapered fingers having inclined sides, and a cam member having tapered sides arranged to fit between any of said fingers, when the steering wheel is swung to its tilted position, the inclined sides of the cam engaging the inclined sides of the fingers forming means for guiding the cam into a locking position.

5. In a steering device, the combination with a steering column including a shell, a steering shaft, a cap threaded on the upper end of the shell, a plurality of pins carried by the cap engaging the shell to prevent turning movement of the cap, and a steering wheel, of a pair of hingedly connected members interposed between the wheel and steering shaft for connection respectively with the wheel and shaft whereby the steering wheel will be permitted to be swung to tilted position in relation to the column, the cap having locking notches formed therein, and a cam formed on the outermost member arranged to fit in any one of said notches when the steering wheel is swung to its tilted position, the members being adapted to overlie certain of the locking pins irrespective of the position of the steering wheel, whereby the removal of the cap by unauthorized persons will be eliminated.

6. In a steering device, the combination with a steering column including a shell, a shaft, a cap for the upper end of the shell, and a steering wheel, of a pair of hingedly connected members interposed between the wheel and the shaft for connection respectively with the wheel and shaft whereby the steering wheel will be permitted to be swung to a tilted position in relation to the column, the inner member having a pair of pivot ears formed thereon, the outer member having a depending hinged barrel arranged between the ears, a wear member interposed in the bore of the hinged barrel, a pivot pin fitted in the wear member, and the pivot ears, means formed on the outer member for engaging the cap when the steering wheel is swung to its tilted position, means for locking the steering wheel against steering movement when swung to its tilted position including a sliding bolt carried by the inner member, the inner member having a bore arranged to receive said bolt, a wear member fitted in the bore for the bolt, a key operated means for actuating the bolt, the hinged barrel having a keeper recess formed therein, and a wear member arranged in the keeper recess, arranged to receive the outer end of the locking bolt when the steering wheel is swung to its tilted position.

ROBERT S. BUSBY.